United States Patent [19]
Crespo

[11] Patent Number: 5,063,645
[45] Date of Patent: Nov. 12, 1991

[54] DOUBLE-MOUTHED CLIP

[76] Inventor: Agustin G. Crespo, La Calderons s/no. 39500, Cabezon De La Sal (Cantabria), Spain

[21] Appl. No.: 514,613

[22] Filed: Apr. 26, 1990

[30] Foreign Application Priority Data

Apr. 26, 1989 [ES] Spain .................... 8901334

[51] Int. Cl.⁵ .............................................. A44B 21/00
[52] U.S. Cl. ....................... 24/501; 24/511; 24/562
[58] Field of Search ............... 24/501, 500, 499, 502, 24/503, 504, 505, 489, 523, 562, 3 J, 3 L, 511

[56] References Cited

U.S. PATENT DOCUMENTS

| 356,127 | 1/1887 | Hoyt | 24/501 |
|---|---|---|---|
| 2,166,884 | 7/1939 | White | 24/562 |
| 2,466,284 | 4/1949 | Stinne | 24/500 |
| 2,492,069 | 12/1949 | Stinne | 24/500 |
| 2,515,286 | 7/1950 | Andersson | 24/501 |
| 2,573,125 | 10/1951 | Wilks | 24/511 |
| 2,615,221 | 10/1952 | Linton et al. | 24/501 |
| 2,748,437 | 6/1956 | Dold | 24/501 |
| 3,137,906 | 6/1964 | Rob | 24/501 |
| 3,324,518 | 6/1967 | Louderback | 24/562 |

FOREIGN PATENT DOCUMENTS

| 0180560 | 12/1954 | Austria | 24/500 |
|---|---|---|---|
| 0909046 | 4/1946 | France | 24/501 |
| 0235030 | 2/1945 | Switzerland | 24/501 |
| 0596141 | 12/1947 | United Kingdom | 24/501 |

Primary Examiner—Victor N. Sakran

[57] ABSTRACT

A clip consists of two symmetrical jaw parts each of which, in its central portion, has a set of teeth so that when the jaw parts are placed together, the teeth of one jaw part mesh with the teeth of the other jaw part. The ends of each jaw part are tapered so that when either end of the clip is pressed together the teeth act as a pivot causing the other end to open.

11 Claims, 2 Drawing Sheets

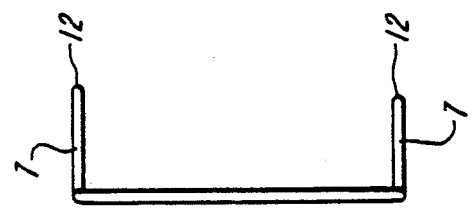
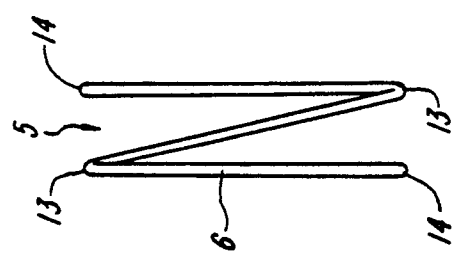
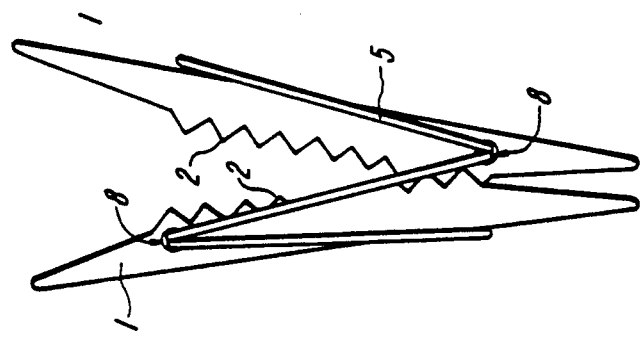
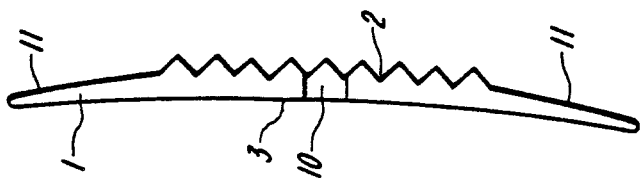
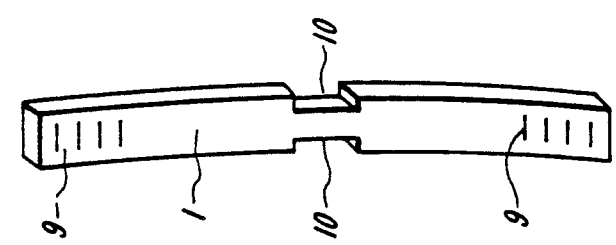

DOUBLE-MOUTHED CLIP

FIELD OF THE INVENTION

This invention relates to a clip which illustratively might be used for gripping and holding objects.

BACKGROUND OF THE INVENTION

A conventional clip such, as a clothespin or an alligator clip, comprises a pair of linear jaw pieces each of which lies on either side of a pivot member. The jaw pieces are arranged so that they contact the pivot at their midpoints. One end of the jaw pieces is fashioned into a gripping portion to hold a workpiece. A spring mechanism forces the gripping portion of the jaw pieces together on one side of the pivot member.

Although this conventional construction is simple and rugged, it is somewhat difficult to assemble and requires that the user orient the clip so that the gripping portion of the jaw pieces faces the workpiece before pressure is applied to open the jaws.

Accordingly, it is an object of the present invention to provide a clip which does not require a particular orientation to the workpiece before being opened.

It is a further object of the present invention to provide a clip which is easy to assemble.

SUMMARY OF THE INVENTION

The foregoing problems are solved and the foregoing objects are achieved in one illustrative embodiment of the invention in which a clip consists of two symmetrical jaw parts each of which, in its central portion, has a set of teeth so that when the jaw parts are placed together, the teeth of one jaw part mesh with the teeth of the other jaw part. The ends of each jaw part are tapered so that when either end of the clip is pressed together the teeth act as a pivot causing the other end to open.

BRIEF DESCRIPTION OF THE DRAWING

The inventive clip is described in the following specification including the drawing which accompanies the specification of which:

FIGS. 6A and 6B show a rear view and an elevation of another embodiment of the symmetrical jaw parts.

FIG. 7 shows an alternative arrangement of the clip which has been constructed with a metal spring.

FIGS. 8A and 8B show detailed top and side views of the metal spring shown in FIG. 7.

DETAILED DESCRIPTION OF THE PREFERRED EMBODIMENTS

Figure 3:
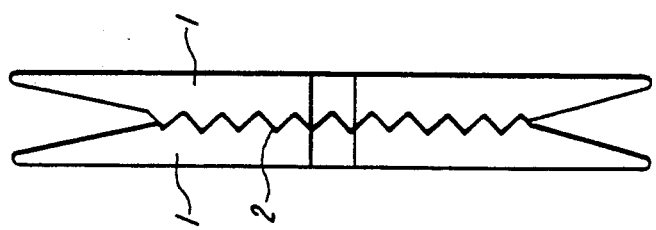
FIG. 3 shows a view of the assembled clip jaw parts.
Figure 2:
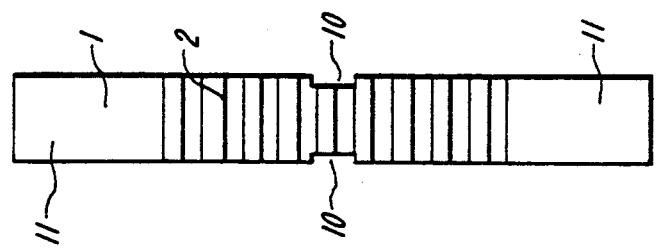
FIG. 2 shows a front view of the teeth on the jaw part.
Figure 1:
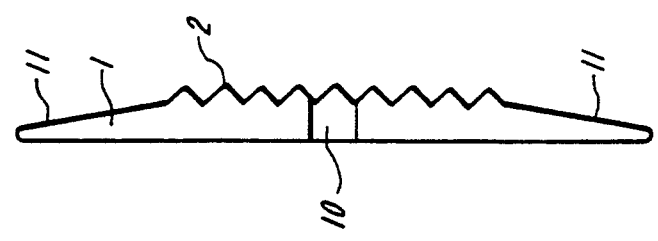
FIG. 1 shows a side elevation of a clip jaw part.

As shown in FIGS. 1 and 2, the inventive clip consists of two identical jaw strips (1) each of which has a toothed section (2) in its central portion. Each strip (1) also has an indented slot (10) in the center of each jaw part side to accommodate an elastomeric ring as will hereinafter be described. Each jaw part has symmetrical tapered ends (11) so that when the strips are put together as shown in FIG. 3, and the strips at either end are pressed together, the opposite strip ends open to act as toothed jaws to grip a workpiece.

Figure 5:
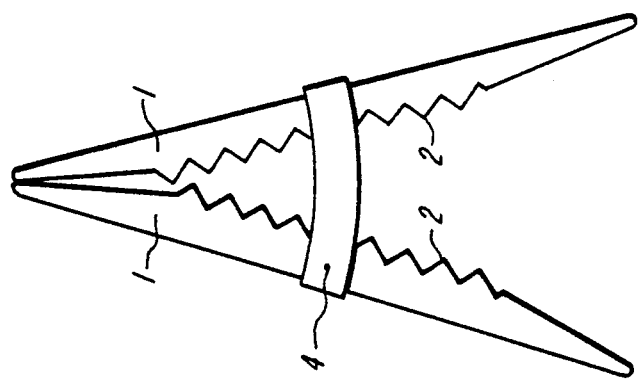
FIG. 5 shows an elevation of the whole clip completely assembled and opened by pressing the upper end.
Figure 4:
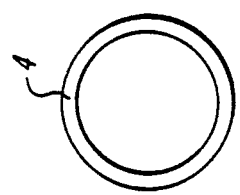
FIG. 4 shows a side view of an elastomeric ring for holding the clip jaw parts.

To ensure that the jaw parts (1) of the clip are held together with a sufficient pressure to grip objects (not shown), the jaw parts (1) are held together by an elastomeric ring (4) shown in FIGS. 4 and 5 which fits into the grooved area (10) in the center of the jaw parts. Therefore, according to the invention, the end teeth on each jaw part act as pivots so that the clip may be opened by pressing together either end as illustratively shown in FIG. 5. The remaining teeth allow the clip to grip the workpiece.

Another embodiment shown in FIGS. 6A and 6B allows a user to hold the clip more easily. In this embodiment, the external surface (3) of each jaw part opposite to the toothed area (2) has a slight concavity with parallel grooves (9) near the ends of the jaw part. The grooves provide a non slip gripping area for the user.

Although the inventive clip has been described as equipped with an elastomeric ring (4) to hold the jaw pieces closed, a metal spring (5) can also be used in place of the elastomeric ring (4) as shown in the alternative arrangement illustrated in FIGS. 7, 8A and 8B.

Metal spring (5) consists of a Z-shaped spring steel wire (6) with parallel arms (7) extending perpendicular to the spring body (6). Spring (5) is fashioned with four arms; two extending from the ends (14) of spring (5) and two formed of wire loops at the angles (13) of the "Z". The ends (12) of the arms (7) which extend from points (13) fit into the holes (8) made in the jaw part sides and the arms (7) which extend from ends (14) rest on the external area of jaw part (1) opposite to the teeth (2). In this manner a double swinging spring effect is achieved so that the clip can be opened by pressing either end.

Although only a few examples of the practical construction of the invention have been described, it is possible to introduce changes in material, shape and arrangement of the elements provided as will be immediately apparent to those skilled in the art. Those changes and modifications in accordance with the invention are intended to be covered by the following claims.

What is claimed is:

1. A double-mouthed clip comprising:
   a pair of identical jaw parts, each of said jaw parts having a symmetrical, elongated shape with a first end, a second end and a central saw-toothed portion wherein said central portion has a substantially constant thickness and said jaw part tapers in thickness from said central portion to said first end and said second end; and
   means for urging said jaw parts together so that said saw-toothed toothed portions face each other and act as pivots on both ends of said clip.

2. A double-mouthed clip according to claim 1 wherein each of said jaw parts is substantially linear.

3. A double-mouthed clip according to claim 1 wherein each of said jaw parts is curved.

4. A double-mouthed clip according to claim 1 wherein said urging means is an elastomeric ring.

5. A double-mouthed clip according to claim 4 wherein each of said jaw parts has a centrally-located slot into which said elastomeric ring fits.

6. A double-mouthed clip according to claim 1 wherein said urging means is a spring.

7. A double-mouthed clip according to claim 6 wherein said spring is Z-shaped and has a first arm which fits into a first hole in one of said jaw parts and said spring has a second arm which fits into a second hole in the other of said jaw parts.

8. A double-mouthed clip according to claim 1 wherein each of said jaw parts has a side opposite to said central toothed portion wherein said side is concave towards said central saw-toothed portion and has parallel grooves at both ends of said jaw parts.

9. A double-mouthed clip comprising:
- a pair of identical jaw parts, each of said jaw parts having a symmetrical, linear shape with a substantially rectangular cross-section, said each jaw part having a first side, a second side, a first end, a second end and wherein said first side is substantially flat and said second side has a central saw-toothed portion, said central toothed portion having a substantially constant thickness and said second side tapering in thickness from said central portion towards said second side at said first end and at said second end; and
- means for urging said jaw parts together so that said toothed portions face each other and act as pivots on both ends of said clip.

10. A double-mouthed clip according to claim 9 wherein said urging means is an elastomeric ring.

11. A double-mouthed clip according to claim 9 wherein said urging means is a spring.

* * * * *